(12) United States Patent
Kim

(10) Patent No.: US 6,624,912 B1
(45) Date of Patent: *Sep. 23, 2003

(54) METHOD FOR CORRECTING VERTICAL ALIGNMENT ERROR IN SHUTTLE SCANNER

(75) Inventor: Han-Sin Kim, Seoul (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 425 days.

(21) Appl. No.: 09/132,751

(22) Filed: Aug. 12, 1998

(30) Foreign Application Priority Data

Aug. 13, 1997 (KR) ............................................ 97-38500

(51) Int. Cl.[7] ............................ G06K 15/00; H04N 1/40
(52) U.S. Cl. ..................... 358/3.23; 358/3.02; 358/447; 358/463
(58) Field of Search ............................ 348/230, 213.15, 348/213.17; 358/461, 468, 230, 213.15, 213.17, 447, 463, 3.02, 3.23; 382/461

(56) References Cited

U.S. PATENT DOCUMENTS

| | | | | |
|---|---|---|---|---|
| 5,335,290 A | * | 8/1994 | Cullen et al. ................... | 382/9 |
| 5,594,556 A | * | 1/1997 | Vronsky et al. ............. | 358/482 |
| 5,778,103 A | * | 7/1998 | Allen et al. .................. | 382/254 |
| 5,854,853 A | * | 12/1998 | Wang ........................... | 382/176 |

* cited by examiner

*Primary Examiner*—Jerome Grant, II
(74) *Attorney, Agent, or Firm*—Robert E. Bushnell, Esq.

(57) ABSTRACT

The reproduced image quality of a shuttle scanner is enhanced by automatically compensating for the scanner's assembly tolerances, using a method for correcting vertical alignment error in a shuttle scanner. The method includes the steps of: (a) initializing a block count of a document to be scanned to a value of N; (b) scanning the Nth block and rasterizing the scanned block into a dot image; (c) shifting each dot of the dot image formed by the rasterized block according to a set of pre-stored correction values; and (d) incrementing the block count and performing the steps (b) through (d) until reaching the end of the document being scanned. The set of pre-stored correction values is produced by the steps of: scanning at least one block of a reference pattern formed on the document to be scanned; comparing the scanned reference pattern with an ideal reference line to calculate a shift value for each dot of the scanned at least one block; and storing the calculated shift values in a memory device. The reference pattern is formed by a vertical line running across at least one block perpendicularly. The memory device installed in the shuttle scanner and programmed at the time of manufacture.

9 Claims, 3 Drawing Sheets

FIG. 3
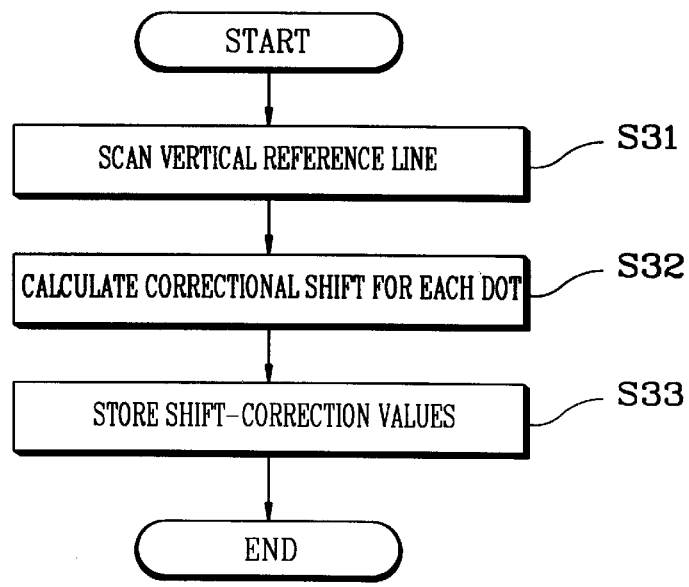
FIG. 4A     FIG. 4B
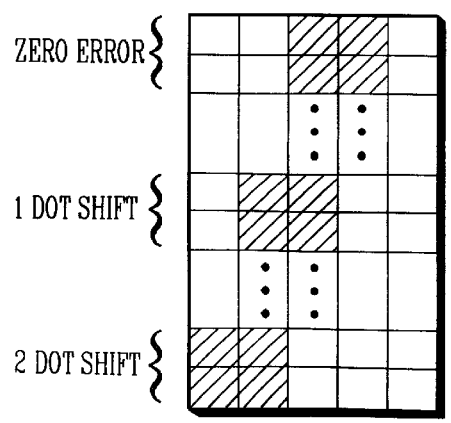
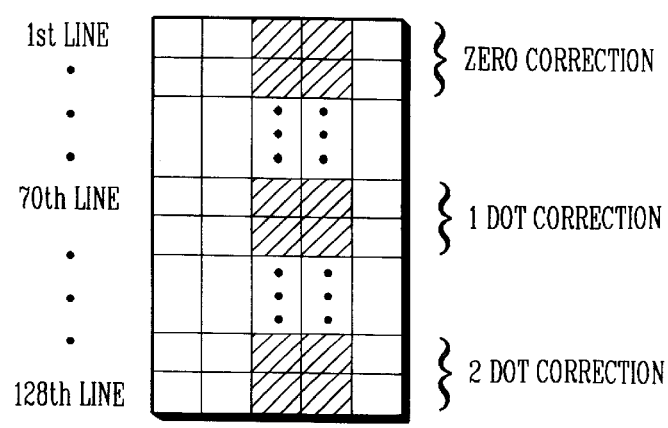

METHOD FOR CORRECTING VERTICAL ALIGNMENT ERROR IN SHUTTLE SCANNER

CLAIM OF PRIORITY

This application makes reference to, incorporates the same herein, and claims all benefits accruing under 35 U.S.C. §119 from my applications entitled Error Correction Method of Vertical Scan Alignment for Shuttle Scanner filed in the Korean Industrial Property Office on Aug. 13, 1997 and there duly assigned Serial No. P97-38500 by that Office.

BACKGROUND OF THE INVENTION

1. Field of the Invention

The present invention relates to a shuttle scanner and, more particularly, to a method for correcting a vertical alignment error in a shuttle scanner, using a shift correction value stored in a programmable read only memory (PROM).

2. Discussion of Related Art

Recently, multi-tasking systems that combine the various functions of a printer, a facsimile machine, a copy machine, a scanner, etc., have been developed. In combining scanner functions with a printer, a shuttle-type scanner using a shuttle scanner module is typically employed. The shuttle scanner module travels across the document original together with the ink cartridge, using the same driving system as that of the print head module. A shuttle scanner, however, has its own unique set of problems in performing a scanning operation.

For example, as shown in FIG. 1A, in scanning a document original using a shuttle scanner module, scanning is performed by dividing the sheet into 22~27 shuttle blocks, depending on the dimensions of the scanner module. In the scanning of a given shuttle block, as shown in FIG. 1B, a vertical trace or slice is scanned, with the scanner module moving across the sheet in a horizontal direction and proceeding with a sequential scanning of each slice until reaching the far edge of the sheet. Here, the 2,551st slice represents the final slice of a scanned block of a letter-sized sheet of paper, assuming a resolution of 300 dpi.

Meanwhile, in manufacturing a shuttle scanner, as with any such apparatus having many components, there is the unavoidable accumulation of assembly tolerances. Of particular concern is the assembly tolerance of a charge-coupled device which is mounted on a printed circuit board installed within the shuttle scanner module and which, by traveling across a document original, performs the actual scanning function via a slit formed in the bottom of the module. These tolerances must be minimized in order to maintain high quality image scanning, since each block is scanned individually to make up the entire image.

To illustrate this problem, a vertical line drawn down through the horizontally arranged blocks of a document original, as shown in FIG. 2A, is scanned. Due to the above-described assembly tolerances, a distorted reproduction such as that shown in FIG. 2B may result. That is, a slight skewing of the charge-coupled device with respect to the true vertical reference line (i.e., one having an infinite slope) as each block is scanned results in the scanned image being reproduced as if each block's segment of the line were slanted. These slanted line segments start in the correct position at the top of each block, but a gradual shifting of the reproduced line, which is image distortion, is generated along the length of the slices of every block. The distortion (slant) may slope either to the right or to the left of vertical, depending on the incongruities and imperfections of a given scanner assembly.

Although high-precision manufacturing may be employed to minimize this problem, such tolerances will always exist to some degree. Besides, this solution leads to a sharp increase in product cost, and so a more practical solution is needed.

SUMMARY OF THE INVENTION

Accordingly, in order to overcome such drawbacks in the conventional art, it is therefore an object of the present invention to provide a method for compensating for the assembly tolerances in manufacturing a shuttle scanner.

It is another object of the present invention to provide a method for reducing the manufacturing costs of a shuttle scanner.

It is still another object of the present invention to provide a method for improving scanned image quality in a shuttle scanner.

It is yet another object of the present invention to provide a method for correcting a vertical alignment error occurring in a scanned image obtained by a shuttle scanner.

It is yet still another object of the present invention to provide a method for calculating a shift correction value in order to correct a vertical alignment error occurring in a scanned image obtained by a shuttle scanner.

To achieve these and other advantages and in accordance with the purpose of the present invention, as embodied and broadly described, there is provided a method for correcting vertical alignment error in a shuttle scanner, comprising the steps of: (a) initializing a block count of a document to be scanned to a value of N; (b) scanning the Nth block and rasterizing the scanned block into a dot image; (c) shifting each dot of the dot image formed by the rasterized block according to a set of pre-stored correction values; and (d) incrementing the block count and performing the steps (b) through (d) until reaching the end of the document being scanned. The set of pre-stored correction values is produced by the steps of: scanning at least one block of a reference pattern formed on the document to be scanned; comparing the scanned reference pattern with an ideal reference line to thereby calculate a shift value for each dot of the scanned at least one block; and storing the calculated shift values in a memory device.

Accordingly, in the above method, a set of correction values is obtained for a given shuttle scanner at the time of manufacture, and the correction values are stored (programmed) in a memory device, e.g., a PROM, installed in the scanner itself. Thus, by comparing the unique program of each scanner with an ideal set of values representing a perfectly aligned construction with respect to a charge-coupled device traveling across a perfect paper feed path, the reproduced output of a scanned image can be corrected for any vertical alignment error.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 3 is a flow chart of a process for calculating vertical alignment correction values, according to the present invention;

FIGS. 4A and 4B are diagrams showing an example of vertical alignment error and the shift correction thereof, respectively, according to the present invention.

DETAILED DESCRIPTION OF THE EMBODIMENT

In manufacturing a shuttle scanner adopting the principles of the present invention, after assembly, a memory device, e.g., a PROM installed within the apparatus, is programmed with a unique set of shift correction values for correcting (shifting) a vertical alignment error in order to compensate for assembly tolerances. The flow chart of FIG. 3 shows a process for calculating the vertical alignment correction values.

Figure 1A:
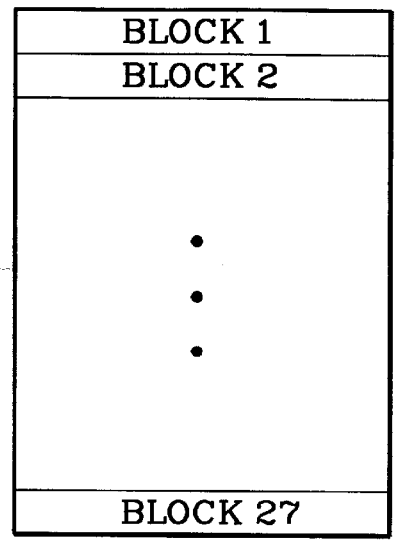
FIGS. 1A and 1B are diagrams illustrating the scanning operation of a shuttle scanner, showing an entire document to be scanned and one shuttle-sized block thereof, respectively.
Figure 1B:
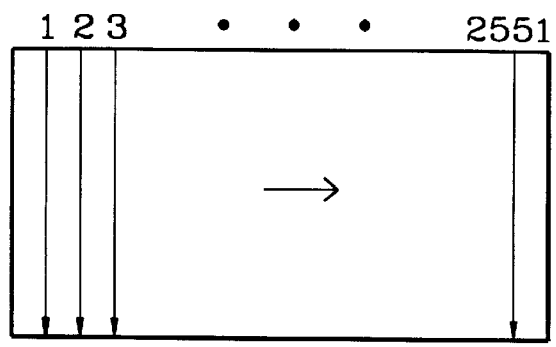
Figure 2A:
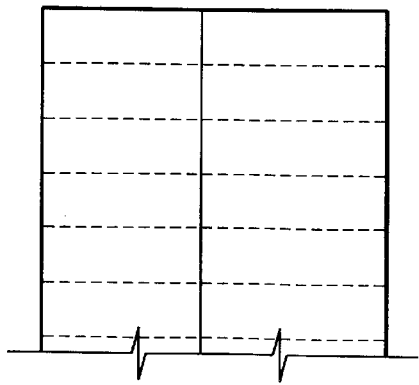
FIG. 2A is a diagram showing a standard reference line drawn across several blocks.
Figure 2B:
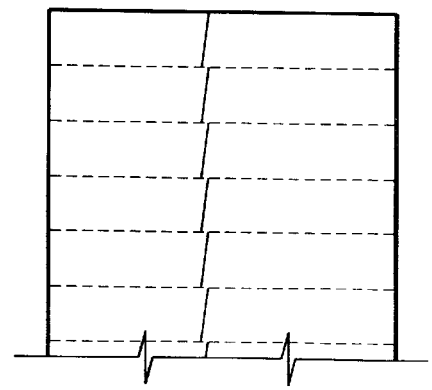
FIG. 2B is a diagram showing a vertical alignment error resulting from scanning the line of FIG. 2A.

Referring to FIG. 3, a vertical reference line (such as that shown in FIG. 2A) is scanned, in a step S31, in order to create a standard set of points along a perfect paper feed path, i.e., perpendicular to the orthogonal travel of the shuttle scanner module, for comparison with an ideal line having an infinite slope. This standard line may be any pattern, having sufficient contrast, which can provide a reference to be measured against the orientation of the charge-coupled device of the traveling shuttle scanner module as obtained through a given assembly process.

The captured image scanned as above is divided into dot units, e.g., 128~160 dots, in accordance with the resolution of the charge-coupled device. In the embodiment of the present invention, 128 dots are assumed, thereby creating 128 rasterized lines as shown in FIGS. 4A and 4B.

In FIG. 4A, the scanned vertical line is registered as a shifting pattern with respect to the dot of the first rasterized line. Here, the first and second lines show no error, but the 70th and 71st lines are each shifted by one dot; and, by the 127th and 128th lines, the error becomes equal to a two-dot shift. At this time, the degree of departure from the ideal vertical line is recognized as the vertical alignment error. Therefore, a set of shift-correction values can be calculated in a step S32, with positive and negative correction such values corresponding to right and left correctional shifting respectively, and a correction value of zero being used when no vertical alignment error is found.

In a step S33, a complete set of shift-correction values is stored in the PROM memory device of the manufactured shuttle scanner. Although the reproduced image quality of an entire document original can be improved by scanning just one block and then storing calculated shift-correction values accordingly, enhanced results can be obtained by scanning more blocks.

Figure 5:
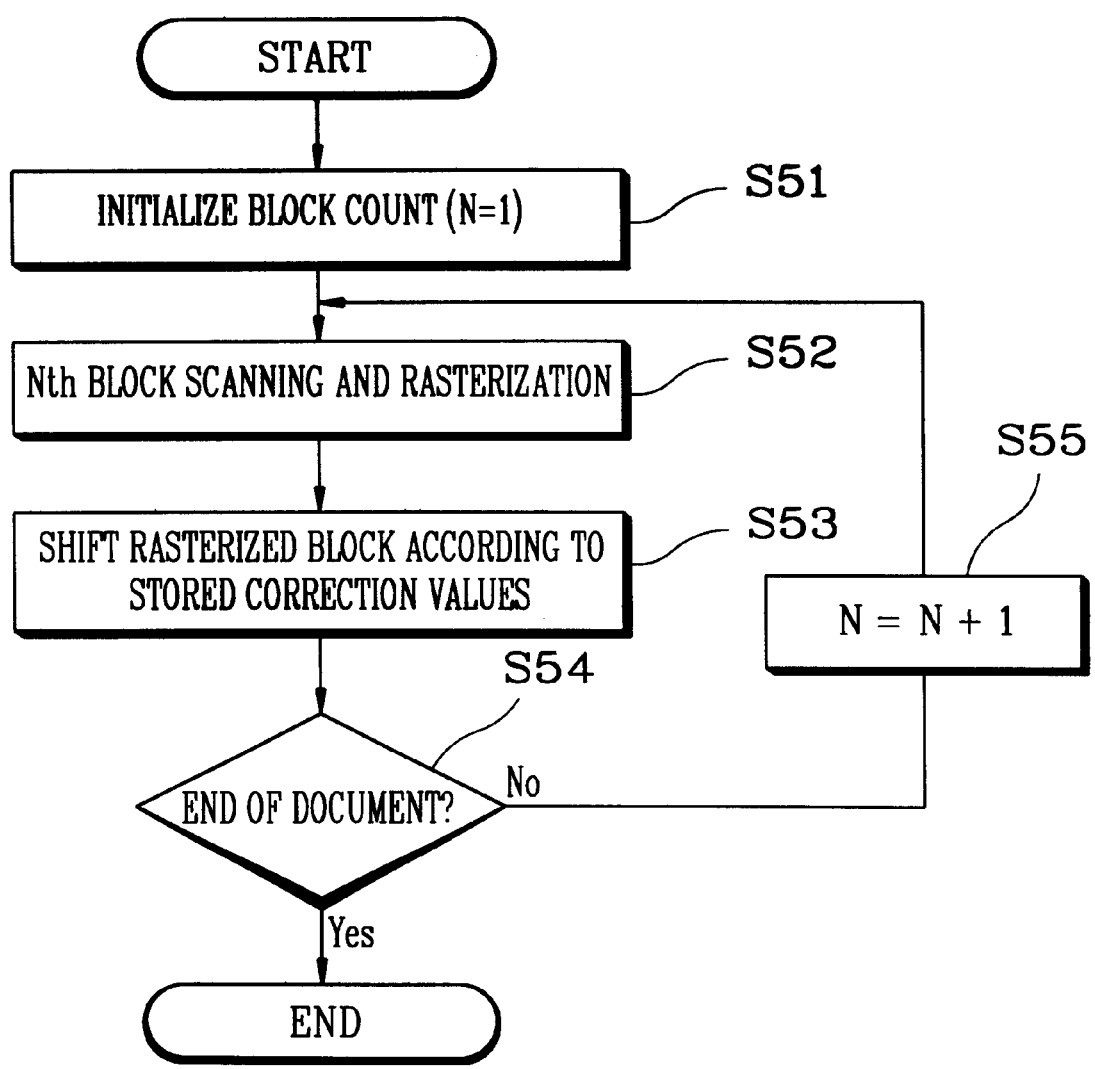
FIG. 5 is a flow chart of a method for correcting vertical alignment error in a shuttle scanner, according to the present invention.

Referring to FIG. 5, to correct the vertical alignment error of a document original to be scanned, the block count N is initialized (set to "1") in a step S51, in order to begin scanning at the first block. Then, in a step S52, scanning and rasterization of the Nth block is performed in the conventional manner. The vertical alignment of each dot of the rasterized block is corrected (shifted) in a step S53, using the correction values stored in memory. The process is repeated for each block by increasing the block count (N=N+1) in a step S55, until the end of the document is reached as determined by a step S54. The thus-corrected image is shown in FIG. 4B.

As above explained, the present invention can enhance the quality of scanning, by compensating for a vertical alignment error caused by assembly tolerances. Further, unit production cost can be kept low since an ultra-precision assembly process is not imperative.

It will be apparent to those skilled in the art that various modifications can be made in the method for correcting vertical alignment error in shuttle scanner of the present invention, without departing from the spirit of the invention. Thus, it is intended that the present invention cover such modifications as well as variations thereof, within the scope of the appended claims and their equivalents.

What is claimed is:

1. A method for correcting vertical alignment error in a shuttle scanner, comprising the steps of:
   (a) initializing a block count of a document to be scanned to a value of N;
   (b) scanning the Nth block and rasterizing the scanned block into a dot image;
   (c) shifting each dot of the dot image formed by the rasterized block according to a set of pre-stored correction values; and
   (d) incrementing the block count and performing said steps (b) through (d) until an end of the document being scanned is reached.

2. The method as claimed in claim 1, wherein the set of pre-stored correction values is produced by the steps of:
   scanning at least one block of a reference pattern formed on the document to be scanned;
   comparing the scanned reference pattern with an ideal reference line to thereby calculate a shift value for each dot of the scanned at least one block; and
   storing the calculated shift values in a memory device.

3. The method as claimed in claim 2, wherein the reference pattern is formed by a vertical line running across at least one block perpendicularly.

4. The method as claimed in claim 3, wherein the memory device is a programmable read only memory installed in said shuttle scanner and programmed at the time of manufacture.

5. A method for correcting vertical alignment error in a shuttle scanner, comprising the steps of:
   (a) producing a set of correction values for correcting the vertical alignment error;
   (b) storing the correction values;
   (c) scanning each block of a document to be scanned; and
   (d) modifying said each block scanned in accordance with the stored correction values.

6. The method as claimed in claim 5, wherein step (a) comprises:
   scanning at least one block of a reference pattern formed on the document to be scanned; and
   comparing the scanned reference pattern with an ideal reference line to thereby calculate a shift value for each dot of the scanned at least one block.

7. The method as claims in claim 6, wherein the reference pattern is formed by a vertical line running across at least one block perpendicularly.

8. The method as claimed in claim 5, wherein step (c) comprises:

initializing a block count of a document to be scanned to a value of N; and scanning the Nth block and rasterizing the scanned block into a dot image.

9. The method as claimed in claim 8, wherein step (d) comprises:

shifting each dot of the dot image formed by the rasterized block according to the stored correction values.

* * * * *